Aug. 8, 1933.   E. S. GRAHAM   1,921,462
SERVING TABLE
Filed Aug. 20, 1932   2 Sheets-Sheet 2
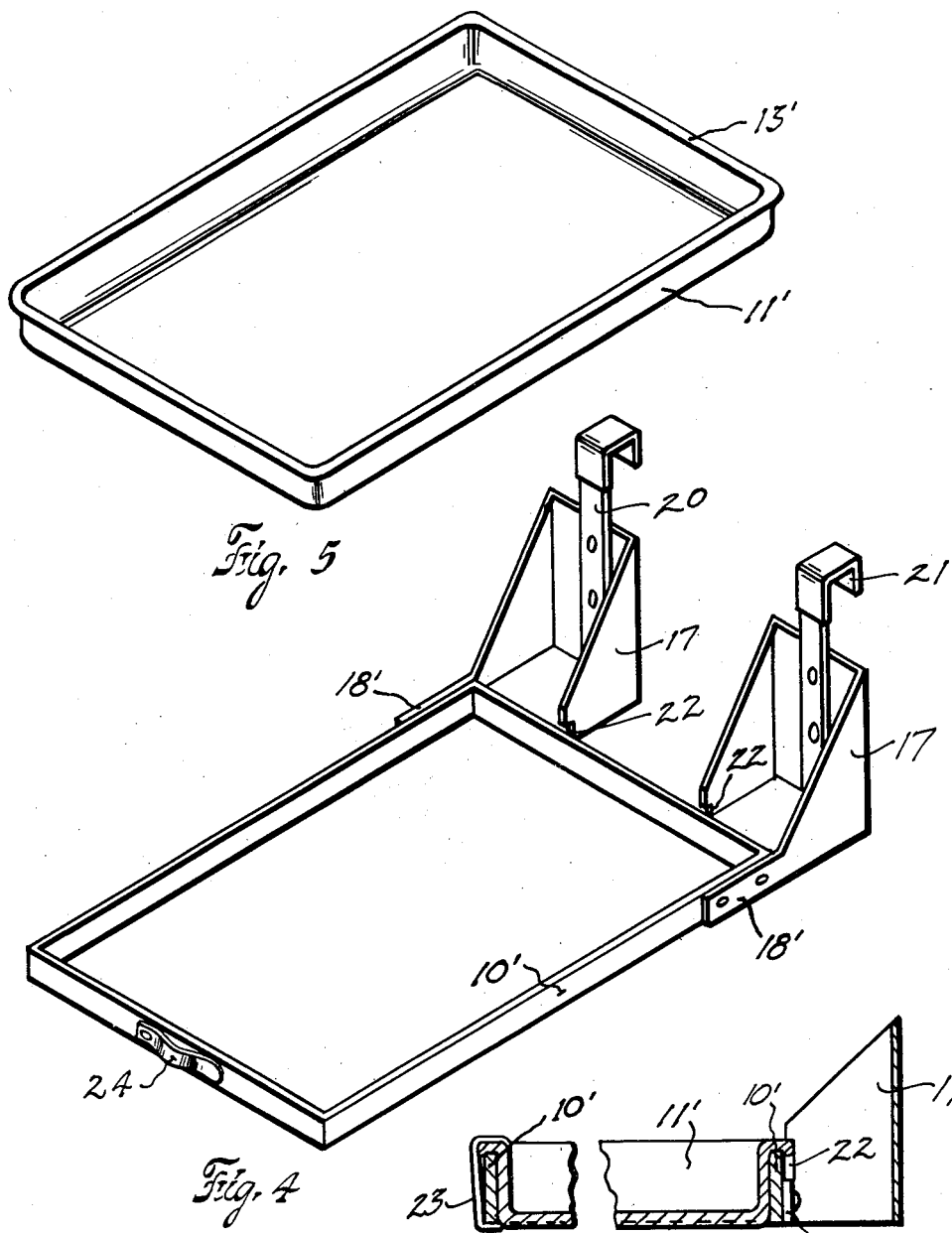
Inventor
Earl S. Graham Patented Aug. 8, 1933

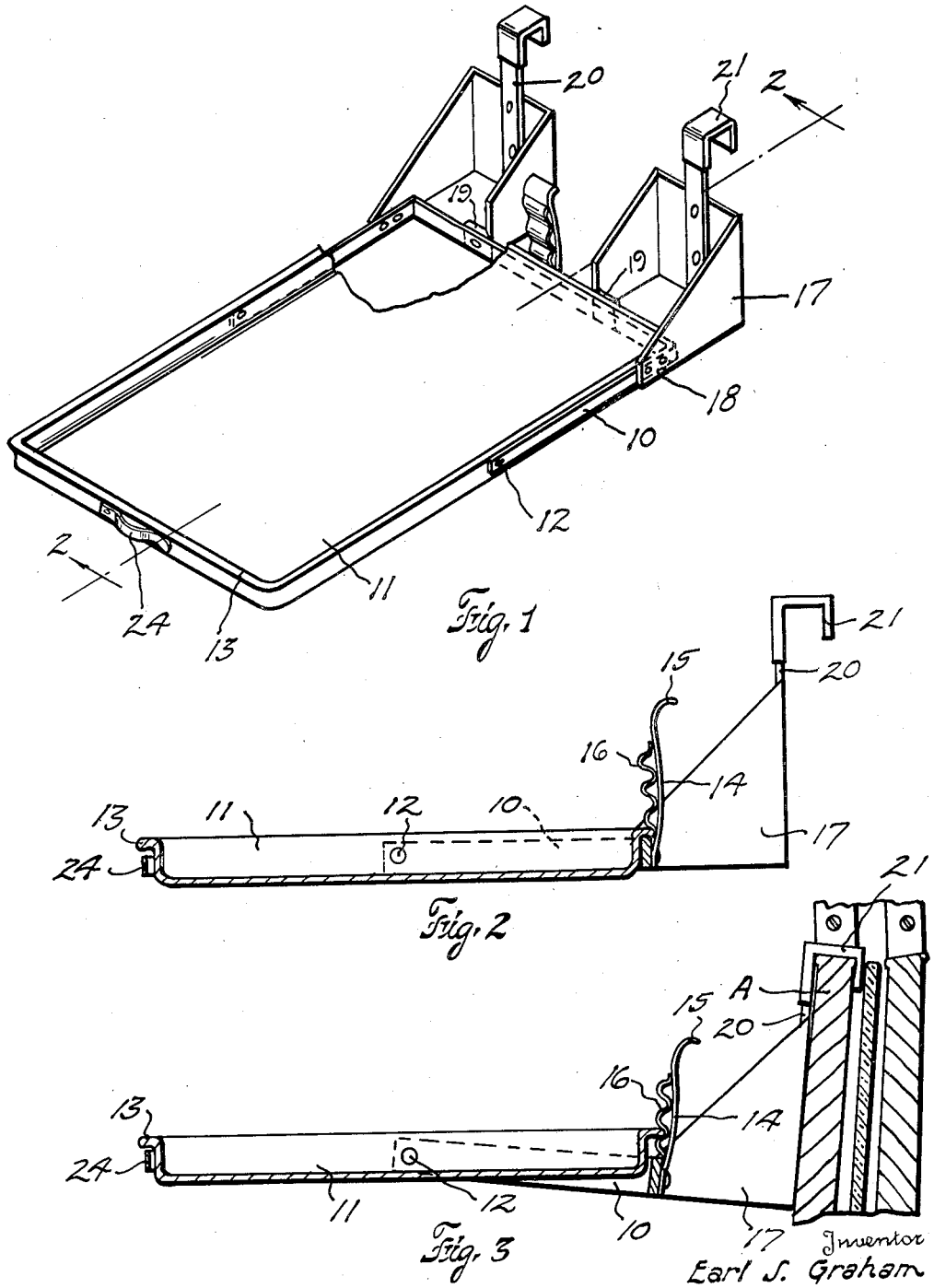

1,921,462

UNITED STATES PATENT OFFICE 1,921,462

SERVING TABLE

Earl S. Graham, Dallas, Tex., assignor to Inside Tray Company, a Corporation of Texas Application August 20, 1932. Serial No. 629,571

8 Claims. (Cl. 45—51)

This invention relates to new and useful improvements in serving tables.

One object of the invention is to provide an improved serving table adapted to be attached to the door or inner side of an automobile for serving drinks and food.

A particular object of the invention is to provide a serving table arranged for mounting on the inside of an automobile and for attachment to the door or window sill so as to support drinks and food in front of the occupant, thereby protecting the clothing from liquid drippings and dropped particles of food, as well as making for convenience.

A further object of the invention is to provide a serving table including an elongated frame for receiving a tray and having supports at one end, whereby said frame and tray may be supported from the door and window on the inside of an automobile and the tray disposed transversely of the automobile; also whereby an ordinary rectangular tray may be mounted in the frame.

Still another object of the invention is to combine with the frame and the supports therefor, receptacles or pockets extending above the tray, for holding small articles such as chewing gum, cigarettes, etc.

A very important object of the invention is to provide a frame with a tray pivotally mounted therein in conjunction with a latch, whereby the tray may be secured in a level position when the frame is held at an inclination, owing to the slanting side wall of the car, against which wall the end of the frame rests.

A further object of the invention is to provide a serving table arranged for mounting on the inside of an automobile for the attachment to a door or window sill, so as to support, below said sill or top of door, a tray for containing drinks and food, in such a manner that all props and supoprts below the tray will be eliminated, thus permitting the tray to be positioned directly over and across the top of the diner without interference from underlying supports or props, as well as not interfering with the raising and lowering of the window glass.

A construction designed to carry out the invention will be hereinafter described together with other features of the invention.

The invention will be more readily understood from a reading of the following specification and by reference to the accompanying drawings in which an example of the invention is shown, and wherein:

Figure 1 is an isometrical view of a serving table constructed in accordance with the invention, Figure 2 is a longitudinal vertical sectional view taken on the line 2—2 of Figure 1, Figure 3 is a view similar to Figure 2, but showing the frame in an inclined position and the tray level and supported on the inner side of the door of an automobile, which is shown in section, Figure 4 is an isometrical view of another form showing a frame for receiving a tray, Figure 5 is an isometrical view of a tray for engaging in the frame, and Figure 6 is a sectional view showing a tray fastened in the frame.

In the drawings the numeral 10 (Figures 1, 2 and 3) designates a frame which is yoke-shaped and right-angular so as to receive one end of a rectangular serving tray 11, which is pivoted in the frame by means of pivots 12. The pivots 12 are carried by the outer ends of the frame and are secured to the central portion of the tray on each side thereof.

An ordinary tray may be used and such trays are usually formed with a rim or flange 13 and this flange overhangs the frame, as is indicated in the drawings. For the purposes of description, the end of the tray which is within the frame will be called the inner end, and the opposite end of the tray will be called the outer end.

At the central portion of the yoke is mounted an upright spring latch 14 having its lower end rigidly attached to the outer side of the frame and provided at its upper end with a curved finger grip 15. On its inner side the latch has a plurality of notched keepers 16 which overhang the rim 13 of the tray. These keepers engage the rim and hold the tray rigidly in the different positions to which it may be swung. If desired, the latch may be curved so as to overhang the tray and more efficiently engage its rim. By grasping the finger grip 15 and pulling the latch away from the tray, the latter is instantly released.

The frame may be provided with any kind of supports, but I prefer to employ a pair of sheet metal boxes or receptacles 17 secured to the corners of the frame. Each box has an extension 18 on its outer side overlapping the frame and rigidly secured thereto. This permits the bottom of the box to abut the transverse member of the frame. At the front of the inner side wall of each box an inturned ear 19 is provided and this is riveted, or otherwise fastened, to the frame. The boxes are spaced apart so as to leave ample room therebetween for the latch 14.

While the boxes may be given any desirable shape, I prefer to incline their upper edges downwardly toward the tray, as is shown in the drawings. This provides ample storage space and at the same time eliminates surplus metal. Upright hangers 20 are secured to the inner sides of the rear walls of the boxes and these hangers have down-turned hooks 21 at their upper ends. These hooks are shaped to engage over the sill A of the window opening of the door or window of an automobile, so that the hangers and boxes may rest against the inner wall of the door or body, whereby the frame 10 is supported on the inside of the vehicle and transversely thereof. The hook 21 may be suitably covered with rubber tubing or the like to protect the finish of the sill.

In the majority of automobiles the inner wall of the door or body is arranged on a slant or at an angle to the perpendicular and, therefore, the frame 10 would be disposed at an inclination. By pivoting a tray and providing the spring latch 14, said tray may be fastened in a level position, thus preventing the spilling of liquids and the sliding of dishes to one end of the tray. By disposing the frame and tray transversely of the vehicle and on the inside thereof, said tray is positioned in front of the occupant and food may be served and eaten without spilling or dropping on the clothes of said occupant. Various commodities, such as cigarettes, chewing gum, and the like, may be placed in the boxes 17.

Another form of the invention is shown in Figures 4, 5, and 6. In this form the frame 10' is made rectangular to receive an ordinary rectangular tray 11' so that the rim 13' will overhang the frame. This permits ordinary trays to be used and the purchaser need only buy the frame if he already has the trays.

The boxes 17 have extensions 18' which are cut flush with the frame so as to permit the rim of the tray to overhang. In this form it is preferable to fit the tray more snugly than in the pivoted structure. The boxes are provided with notches 22 for receiving the rim of the tray and the outer end of the tray may be fastened in the frame by means of a clip 23, as is shown in Figure 6. A spring finger 24 may be secured on the outer end of the tray 11 or on the outer end of the frame 10' for holding napkins and other flat articles. The tray 11' may, of course, be removed whenever it is desired.

The description which has been given recites more or less detail of a particular embodiment of the invention, which is set forth as new and useful, however, I desire it understood that the invention is not limited to such exact details of construction because it is manifest that changes and modifications may be made within the scope of the appended claims without departing from the spirit of the invention.

What I claim and desire to secure by Letters Patent is:

1. In a serving table, a frame, a tray mounted in the frame, boxes secured to one end of the frame, and hangers attached to the boxes.

2. In a serving table, a rectangular frame, a rectangular tray mounted in the frame, boxes secured to one end of the frame, and hangers secured to the boxes for mounting the table on the wall of an automobile body and supporting the tray transversely of the body.

3. In a serving table, a frame, a tray pivoted transversely in the frame, boxes secured to one end of the frame, a latch mounted on the frame and engaging the tray, and hangers attached to the boxes.

4. In a serving table, a frame, a tray mounted in the frame and having its rim overlying the frame, means for engaging the rim of the tray for fastening it in position in the frame, boxes rigidly secured to the corners of the frame at one end thereof, and hangers extending upwardly from the boxes.

5. In a serving table, a yoke-shaped frame, a rectangular serving tray pivoted within said frame, a spring latch mounted on the frame and having keepers for engaging the rim of the tray, and hangers connected with the frame for suspending the latter.

6. In a serving table for automobiles, a support having upright hangers at one end for engaging the wall of an automobile and holding the support transversely below the top of said wall, a frame transversely pivoted in the support, whereby it may be leveled independently of the support after said support has been placed in position, and means between the hanger and tray for holding said tray in its adjusted positions.

7. In a serving table, an open angular support, a tray pivoted transversely within said support, means on the support for fastening the tray in different adjusted positions to level it, and an inwardly extending hanger rigidly attached to said support, the table being free from props underlying the tray.

8. In a serving table, a support having upwardly extending hangers at one end for engaging the top of an automobile body wall and holding said support transversely, a serving tray transversely hinging in said support and free to be swung upwardly and downwardly, whereby said tray may be leveled irrespective of the position of said support, and means carried by the support for fastening the tray in its different adjusted positions, the support and tray being free from underlying props.

EARL S. GRAHAM.